United States Patent
Shin et al.

(10) Patent No.: US 11,688,263 B2
(45) Date of Patent: Jun. 27, 2023

(54) MOTION DETECTION USING WIRELESS LOCAL AREA NETWORKS

(71) Applicant: Google LLC, Mountain View, CA (US)

(72) Inventors: Dongeek Shin, Santa Clara, CA (US); Yu Wen, San Ramon, CA (US); Zhifeng Cai, Palo Alto, CA (US); Brian Mitchell Silverstein, San Carlos, CA (US); Raymond Reynolds Hayes, Los Gatos, CA (US); Kevin N. Hayes, Mountain View, CA (US)

(73) Assignee: Google LLC, Mountain View, CA (US)

( * ) Notice: Subject to any disclaimer, the term of this patent is extended or adjusted under 35 U.S.C. 154(b) by 111 days.

(21) Appl. No.: 17/294,268

(22) PCT Filed: Jan. 8, 2019

(86) PCT No.: PCT/US2019/012793
§ 371 (c)(1),
(2) Date: May 14, 2021

(87) PCT Pub. No.: WO2020/145949
PCT Pub. Date: Jul. 16, 2020

(65) Prior Publication Data
US 2022/0005337 A1 Jan. 6, 2022

(51) Int. Cl.
*G08B 21/02* (2006.01)
*G08B 21/04* (2006.01)
(Continued)

(52) U.S. Cl.
CPC ......... *G08B 21/043* (2013.01); *G08B 29/188* (2013.01); *H04L 5/0055* (2013.01);
(Continued)

(58) Field of Classification Search
USPC ... 340/573.1, 463–464, 488, 539.11–539.14, 340/539.22, 573.2, 692, 825.19, 5.52,
(Continued)

(56) References Cited

U.S. PATENT DOCUMENTS 10,109,167 B1 * 10/2018 Olekas ................... G08B 13/24
2016/0127937 A1 * 5/2016 Schelstraete .......... H04W 88/08
370/252
(Continued)

FOREIGN PATENT DOCUMENTS

CN 105828289 8/2016
CN 106407905 2/2017
(Continued)

OTHER PUBLICATIONS

"CSI-Based Fingerprinting for Indoor Localization: A Deep Learning Approach", IEEE Transactions On Vehicular Technology, 2016, 14 pages.
(Continued)

*Primary Examiner* — Daniel Previl
(74) *Attorney, Agent, or Firm* — Colby Nipper PLLC

(57) ABSTRACT

This document describes techniques and devices to detect and classify human and animal presence and/or motion based on changes in the interaction of the human or animal with Wireless Local Area Network (WLAN) radio frequency (RF) signals within or about a building structure, such as a home or office. A first WLAN device transmits a sounding packet to a second WLAN device and receives an acknowledgement (ACK) of receiving the sounding packet by the second WLAN device. The first WLAN device uses the received ACK to determine Channel State Information (CSI) for an RF signal path between the first WLAN device and the second WLAN device, aggregates the determined CSI with
(Continued)

additional CSI, and uses the aggregated CSI to determine a presence or a motion within the structure.

20 Claims, 10 Drawing Sheets

(51) Int. Cl.
    *G08B 29/18*     (2006.01)
    *H04L 5/00*     (2006.01)
    *H04L 67/00*     (2022.01)
    *H04W 4/02*     (2018.01)
    *G08B 13/24*     (2006.01)
    *H04L 67/104*     (2022.01)

(52) U.S. Cl.
    CPC .............. *H04L 67/34* (2013.01); *H04W 4/027* (2013.01); *G08B 13/2491* (2013.01); *H04L 67/104* (2013.01)

(58) Field of Classification Search
    USPC .............................................. 340/5.81, 539.2
    See application file for complete search history.

(56) References Cited

U.S. PATENT DOCUMENTS

| | | | |
|---|---|---|---|
| 2016/0261969 A1* | 9/2016 | Venkatraman | G01S 5/0072 |
| 2016/0295482 A1* | 10/2016 | Belghoul | H04W 36/32 |
| 2017/0019837 A1* | 1/2017 | Katar | H04W 36/0094 |
| 2017/0079027 A1* | 3/2017 | Chun | H04W 28/10 |
| 2017/0195016 A1* | 7/2017 | Alexander | H04B 7/0417 |
| 2018/0285088 A1 | 10/2018 | Lancioni et al. | |
| 2021/0153114 A1* | 5/2021 | Lindheimer | H04W 48/02 |

FOREIGN PATENT DOCUMENTS

| | | |
|---|---|---|
| CN | 106802404 | 6/2017 |
| WO | 2016011433 | 3/2016 |
| WO | 2017100706 | 6/2017 |
| WO | 2020145949 | 7/2020 |

OTHER PUBLICATIONS

"Human Movement Detection in Wi-Fi Mesh Networks", Technical Disclosure Commons; Defensive Publications Series; Dec. 7, 2017, 8 pages.

"International Search Report and Written Opinion", PCT Application No. PCT/US2019/012793, dated Jun. 19, 2019, 17 pages.

"Mesh Networks Delivering IP-Based Seamless Mobility in Municipal and Ad Hoc Wireless Networks", Motorola .Jun. 2006, White Paper, 12 pages.

"International Preliminary Report on Patentability", Application No. PCT/US2019/012793, dated Jun. 16, 2021, 12 pages.

"Foreign Office Action", EP Application No. 19704077.7, dated Dec. 14, 2022, 8 pages.

\* cited by examiner

MOTION DETECTION USING WIRELESS LOCAL AREA NETWORKS

RELATED APPLICATION(S)

This application is a national stage entry of International Application No. PCT/US2019/012793, filed Jan. 8, 2019, the disclosure which is incorporated herein by reference in its entirety.

Background

Motion detection of human and animal (pet) activity has been widely used in applications such as home security systems and home-health-and-safety monitoring systems. Conventional motion detection systems use media of visible light, infrared light, or mechanical vibration, to monitor and recognize human (and animal) behavior. These conventional techniques all require costly installation of new detection devices such as cameras, infrared sensors, or vibration detectors.

Conventional monitoring devices and systems are, to some degree, intrusive on family lives or business activities. These conventional techniques may require a user to manage operational configurations to allay privacy concerns that may arise with conventional monitoring devices.

SUMMARY

This summary is provided to introduce simplified concepts of motion detection using wireless local area networks. The simplified concepts are further described below in the Detailed Description. This summary is not intended to identify essential features of the claimed subject matter, nor is it intended for use in determining the scope of the claimed subject matter.

In aspects, methods, devices, systems, and means for motion detection using wireless local area networks (WLANs) are described in which a first WLAN device transmits a sounding packet to a second WLAN device and receives an acknowledgement (ACK) of receiving the sounding packet by the second WLAN device. The first WLAN device uses the received ACK to determine Channel State Information (CSI) for an RF signal path between the first WLAN device and the second WLAN device, aggregates the determined CSI with additional CSI, and uses the aggregated CSI to determine a presence or a motion within a building structure.

In other aspects, methods, devices, systems, and means for motion detection using wireless local area networks are described in which a first WLAN device determines that a second WLAN device can be updated to transmit sounding packets for motion classification and initiates an update request that is effective to cause a cloud-based server to update software in the second WLAN device. The first WLAN device receives a first sounding packet from the second WLAN device, after the update of the software of the second WLAN device. The first WLAN device transmits a first acknowledgement (ACK) of receiving the first sounding packet to the second WLAN device. The transmission of the first ACK causes the second WLAN device to determine Channel State Information (CSI) for a radio frequency (RF) signal path between the first WLAN device and the second WLAN device and to transmit the determined CSI to the first WLAN device.

A method for classifying motion, by a first wireless local area network (WLAN) device is provided. The method comprises transmitting, by the first WLAN device, a sounding packet to a second WLAN device and receiving, from the second WLAN device, an acknowledgement (ACK) of receiving the sounding packet by the second WLAN device. The method further comprises using the received ACK, determining Channel State Information (CSI) for a radio frequency (RF) signal path between the first WLAN device and the second WLAN device, aggregating the determined CSI with additional CSI, and determining, using the aggregated CSI, a presence or a motion within a structure.

The method may further comprise receiving at least some of the additional CSI from a third WLAN device.

The first WLAN device may be a mesh WLAN Access Point (AP), the first WLAN device may be a root AP in a mesh WLAN, the second WLAN device and the third WLAN device may be APs in the mesh WLAN, and the method may further comprise receiving at least some of the additional CSI from a third WLAN device.

The method may further comprise scheduling, by the first WLAN device, transmission of sounding packets by the first, second, and third WLAN devices and receiving, by the first WLAN device, at least some of the additional CSI from the second and third WLAN devices.

The sounding packets may be transmitted using a backhaul radio link between the APs in the mesh WLAN.

The first WLAN device may be a WLAN Station (STA), the second WLAN device and the third WLAN device may be STAs in the WLAN, the method may further comprise scheduling, by the first WLAN device, transmission of sounding packets by the first, second, and third WLAN devices. The method may further comprise receiving, by the first WLAN device, at least some of the additional CSI from the second and third WLAN devices.

The method may further comprise forwarding the determined presence or motion to a cloud-based service that is effective to cause the cloud-based service to change state information related to the structure.

The method of determining the presence or the motion may further comprise extracting motion features from the aggregated CSI, selecting motion features from the extracted motion features, and classifying the selected motion features to determine the presence or the motion.

The determined presence or motion may be one of: no presence, a human presence, an animal presence, a human sitting, a human walking, or a human falling.

The WLAN may be an IEEE 802.11 WLAN, the sounding packet may be an IEEE 802.11 Null Data Frame (NDF), and the ACK may be IEEE 802.11 ACK.

A wireless local area network (WLAN) device is also provided. The WLAN device comprises a WLAN radio transceiver and a processor and memory system to implement a motion sensing manager application. The motion sensing application is configured to transmit, using the WLAN radio transceiver, a sounding packet to another WLAN device and receive, from the other WLAN device, an acknowledgement (ACK) of reception of the sounding packet by the other WLAN device. The motion sensing application is further configured to, using the received ACK, determine Channel State Information (CSI) for a radio frequency (RF) signal path between the WLAN device and the other WLAN device, aggregate the determined CSI with additional CSI, and determine, using the aggregated CSI, a presence or a motion within a structure.

The motion sensing manager application may be further configured to determine the presence or the motion within the structure by: extracting motion features from the aggregated CSI, selecting motion features from the extracted motion features, and classifying the selected motion features to determine the presence or the motion.

The WLAN device may be an IEEE 802.11 station (STA) device or an IEEE 802.11 Access Point (AP), and the other WLAN device may be an IEEE 802.11 STA device or an IEEE 802.11 AP device.

A method for classifying motion, by a first wireless local area network (WLAN) device in a WLAN network is provided. The method comprises determining, by the first WLAN device, that a second WLAN device can be updated to transmit sounding packets for motion classification and initiating an update request that is effective to cause a cloud-based server to update software in the second WLAN device. The method further comprises receiving, by the first WLAN device, a first sounding packet from the second WLAN device after the update of the software of the second WLAN device. The method further comprises transmitting, to the second WLAN device, a first acknowledgement (ACK) of receiving the first sounding packet, the transmitting being effective to cause the second WLAN device to: determine Channel State Information (CSI) for a radio frequency (RF) signal path between the first WLAN device and the second WLAN device and transmit the determined CSI to the first WLAN device.

The method may further comprise transmitting, by the first WLAN device, a second sounding packet to the second WLAN device and receiving, from the second WLAN device, a second ACK of the second sounding packet being received by the second WLAN device. The method may further comprise using the received second ACK, determining Channel State Information (CSI) for a radio frequency (RF) signal path between the first WLAN device and the second WLAN device and receiving additional CSI from the second WLAN device. The method may further comprise aggregating the determined CSI with the additional CSI and determining, using the aggregated CSI, a presence or a motion within a structure.

The method of determining that the second WLAN device can be updated to transmit sounding packets for motion classification may further comprise sending, by the first WLAN device, a request to a cloud-based service to identify WLAN devices installed at a structure that can be updated to support motion classification.

The initiating the update request may be effective to cause the cloud-based service to send a notification to a user to approve the update.

The method may further comprise transmitting additional sounding packets to a third WLAN device that is not capable of supporting motion classification. The method may further comprise receiving, from the third WLAN device, ACKs for the additional sounding packets received by the third WLAN device, and using the ACKs for the additional sounding packets, determining CSI for an RF signal path between the first WLAN device and the third WLAN device.

The first WLAN device may be an IEEE 802.11 station (STA) device, the second WLAN device may be an IEEE 802.11 STA device, and the third WLAN device may be an IEEE 802.11 Access Point (AP).

The method may further comprise scheduling, by the first WLAN device, transmissions of sounding packets by the second WLAN device. The method may further comprise transmitting the schedule for sounding packet transmissions to the second WLAN device, the transmitting causing the second WLAN device to transmit sounding packets according to the schedule.

The WLAN may be an IEEE 802.11 WLAN, the sounding packet may be an IEEE 802.11 Null Data Frame (NDF), and the ACK may be an IEEE 802.11 ACK.

The details of one or more implementations are set forth in the accompanying drawings and the following description. Other features and advantages will be apparent from the description and drawings and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

Aspects of motion detection using wireless local area networks are described with reference to the following drawings. The same numbers are used throughout the drawings to reference like features and components.

DETAILED DESCRIPTION

Figure 1:
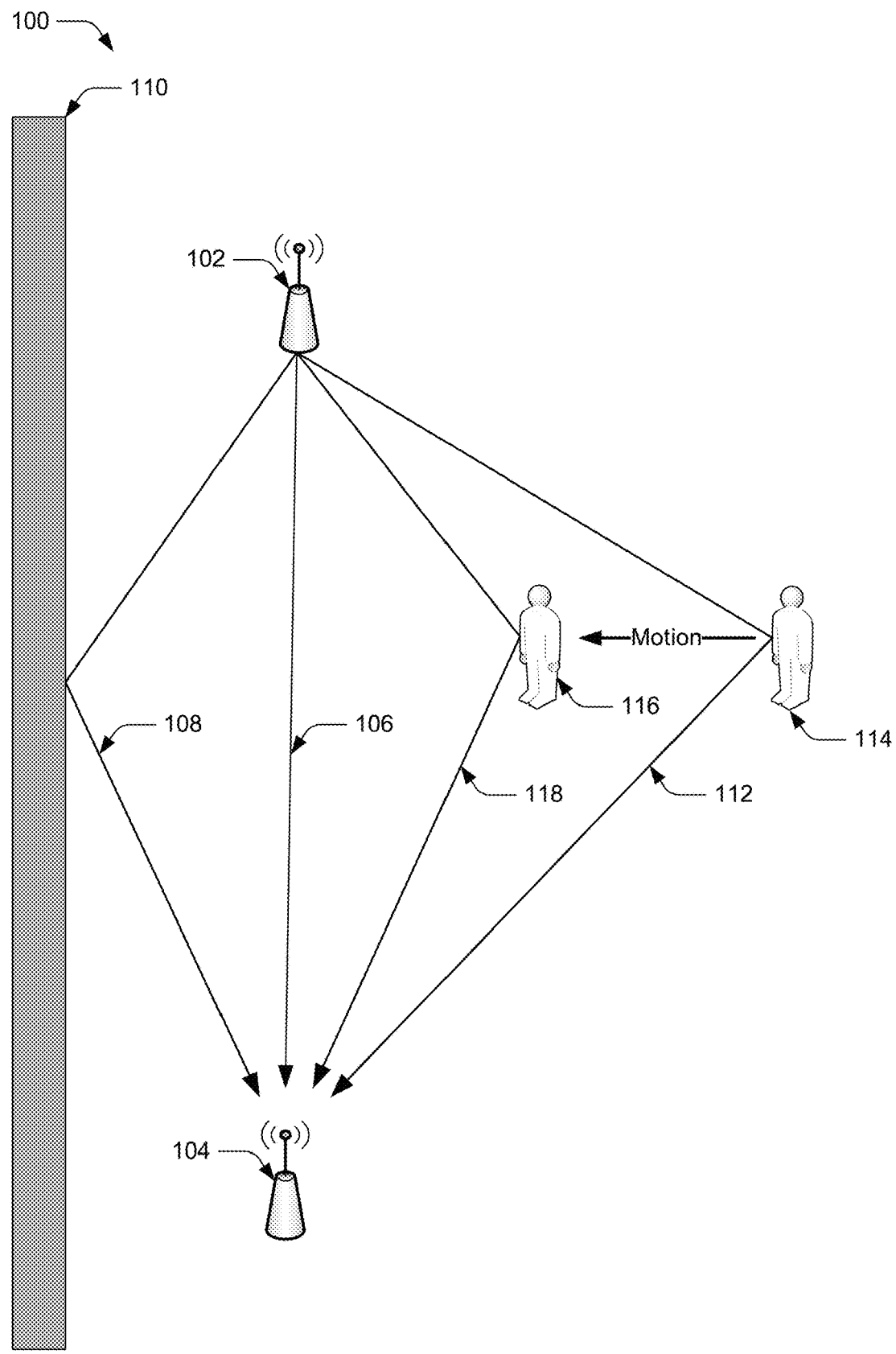
FIG. 1 illustrates an example environment that illustrates the disturbance of WLAN RF signals by human motion within a structure.

This document describes techniques and devices to detect and classify human and animal presence and/or motion based on changes in the interaction of the human or animal with Wireless Local Area Network (WLAN) radio frequency (RF) signals within or about a building structure, such as a home or office. A first WLAN device transmits a sounding packet to a second WLAN device and receives an acknowledgement (ACK) of receiving the sounding packet by the second WLAN device. The first WLAN device uses the received ACK to determine Channel State Information (CSI) for an RF signal path between the first WLAN device and the second WLAN device, aggregates the determined CSI with additional CSI, and uses the aggregated CSI to determine a presence or a motion within the structure.

As the Internet-of-Things (IoT) expands, smart devices continue to proliferate. Internet-connected thermostats, appliances, vehicles, phones, lights, and machines are found in all areas of life, including home, work, business, recreation, and school. Many of these Internet-connected devices communicate using wireless networks and wireless protocols. Although a primary purpose of such wireless communication is to transfer information between or among the various devices, the transmission signals themselves can provide additional information. In particular, changes or variations in the transmission signals can indicate presence or lack of presence of a person, animal, or object in the physical space of the wireless network. Changes or variations can also indicate motion, lack of motion, changes in motion, or cessation of motion in the physical space of the wireless network. Advantageously, the additional information can be derived from the existing wireless network without additional equipment, hardware, or other devices.

Wireless networks, including mesh networks, can not only transmit information among various network devices but can also monitor changes or variations in the transmission signals used to communicate the information. Monitoring changes or variations in transmission signals can indicate presence, motion, lack of motion, or other characteristics about the physical space in which the wireless network operates without the need for additional equipment or dedicated devices.

Wireless networks, such as Wi-Fi, Bluetooth, and mesh networks like Zigbee, Z-Wave, and others all involve wirelessly connected components. Some components include routers, switches, plugs, repeaters, lights, thermostats, appliances, and many other types of devices. The wireless components can also connect to and interact with one another. For example, a home theater system that is turning on could send a signal that instructs the lights in the room to dim after a certain amount of time. The components may also be connected to other devices via the internet or other network connections. In such cases, the wireless components can be accessed and manipulated using a web browser, an application on a mobile device, a local remote, or programing system (e.g., voice commands, home automation systems).

As these various devices communicate with one another, RF signals pass throughout the physical space or geography of the wireless network. As discussed below, when a person moves through the physical space, the propagation of the RF signals is affected by the presence of the person. Machine Learning (ML) techniques can be used to train an ML system to classify human activities based on the changes in the propagation of the RF signals.

Conventional ML techniques for this classification are based on image classification techniques and require relatively large amounts of input data and computing resources to perform the classifications. In aspects, motion detection using wireless local area networks performs feature extraction on Channel State Information (CSI) data to detect and classify presence and motion. The use of feature extraction from CSI data reduces the volume of data required as an input to classification, as well as reducing the computation resources required for presence and motion detection.

In other aspects, CSI data can be acquired using various WLAN-enabled devices, such as Access Points (APs) and/or WLAN client devices (e.g., WLAN Station (STA) devices). The WLAN-enabled devices can operate in a WLAN network using any suitable network topology such as a bus network, a star network, a ring network, a mesh network, a star-bus network, a tree, or hierarchical network, and the like.

For example, multiple WLAN (e.g., IEEE 802.11, Wi-Fi) APs providing a mesh WLAN network can acquire the CSI data for transmissions between the WLAN APs. In another example, WLAN client devices being served by a single WLAN AP can acquire the CSI data based on transmissions between the WLAN client devices and/or transmissions between the WLAN client devices and the single WLAN AP.

In another aspect, a device local to the WLAN can process the CSI data to detect motion, or a cloud service can process the CSI data to detect motion. For example, a root AP in a mesh LAN may receive CSI data from other APs and perform the motion detection. In an alternative example, an AP or STA device can forward the CSI data to a cloud service where the motion detection is performed.

In a further aspect, the collection of CSI data is based on standards-defined communication techniques. For example, a first WLAN device can transmit a null data frame (NDF) to a second device. The second device responds with an acknowledgement (ACK) of the null data frame. The first wireless device calculates the CSI data based on the received acknowledgement. By using standards-defined communication for channel probing, any WLAN device can be updated (e.g., downloading an updated software image to the device) to add motion detection capabilities in upper layer(s) of the network stack of the WLAN device, without modification of the standards-based Media Access Control (MAC) and Physical (PHY) layers of the WLAN network stack and the WLAN radio hardware.

Example Environment

FIG. 1 illustrates an example environment 100 that illustrates the disturbance of WLAN RF signals by human motion within a structure. A number of RF signal paths are illustrated between a first WLAN device 102 and a second WLAN device 104. An RF signal 106 can propagate directly (e.g., line-of-sight (LOS) propagation) from the first WLAN device 102 to the second WLAN device 104. Other RF signals between the first WLAN device 102 and the second WLAN device 104 are reflected signals. For example, an RF signal 108 is reflected off a wall 110 of a structure where the WLAN is deployed. The characteristics of the RF signals 106 and 108 received at the second WLAN device 104 will remain constant over time as long as the physical relationship of the first WLAN device 102, the second WLAN device 104 and the surrounding structure are unchanged.

Other RF signals between the first WLAN device 102 and the second WLAN device 104 can vary based on the motion of humans (or animals) within the structure. For example, an RF signal 112 reflects off a person at position 114 instead of propagating until the RF signal 112 reaches an element of the structure. The alteration of the reflection, as compared to reflections in an empty structure, can be used to detect the presence of the person at position 114. As the person moves to the position 116, an RF signal 118 is reflected off the person. Changes in the characteristics of multiple RF signals over time can be used to determine motion, whether a human or an animal, such as a dog, is in motion and/or moving, and what type of motion is detected, such as walking, sitting, falling, or the like.

In addition to changing characteristics of reflected RF signals, LOS signals can also be affected (e.g., attenuated) by the presence of the human. For example, if the human continued along the path of motion to a point that intersects the RF signal 106 between the first WLAN device 102 and the second WLAN device 104 (not illustrated in FIG. 1 for the sake of clarity), the RF signal 106 would be attenuated due to blocking of the RF signal 106 by the human.

Presence and Motion Detection

To acquire WLAN channel information, WLAN devices (initiators) are scheduled to periodically transmit sounding packets, such as unicast IEEE 802.11 Null Data Frames (NDFs), to another WLAN device. The WLAN device that receives the NDF responds to the initiator by transmitting an acknowledgement (ACK), such as an IEEE 802.11 ACK, to the initiator. The ACK is used as a sounding signal for the RF channel(s) between the initiator and the other WLAN device.

For example, in a mesh WLAN system with multiple APs, a root AP may schedule periodic NDF transmissions to other APs in the mesh network to acquire channel soundings between the root AP and each of the other APs. The APs are typically stationary devices which provide soundings between fixed locations in the structure where the WLAN is deployed. The root AP may also schedule other APs to transmit NDFs to acquire sounding information for the locations of the other APs. Alternatively or optionally, the APs receiving an NDF can use the received NDF as a sounding signal. In another alternative or option, other WLAN STA devices that are stationary (e.g., a WLAN-connected thermostat, a television streaming device, a WLAN-connected camera, or the like) can be included as initiators and/or recipients of NDFs for acquiring channel sounding data. Other example WLAN configurations and soundings in those configurations is described in further detail below.

The initiator(s) calculate a radio link signal spectrogram and channel state information (CSI) based on the ACK packet. Alternatively or optionally, the APs receiving an NDF can calculate a radio link signal spectrogram and CSI based on the received NDF. In a further alternative or option, non-null data frames received by a WLAN device can also be utilized to extract radio link signal spectrograms and CSI.

The radio link signal spectrograms and channel state information (CSI) acquired by WLAN devices in the WLAN are aggregated for recognition of presence, motion, and/or human behavior at a detection server. Both the aggregated radio signal spectrogram and CSI data from the WLAN links are fed as inputs to a Machine-Learning (ML) algorithm, executed at the detection server, to recognize human behavior in the proximity of WLAN devices. The detection server can be located on a device in the WLAN, such as the root AP of the WLAN, at a remote (cloud-based) server device, or both. Alternatively or optionally, portions of the recognition processing can be distributed in any suitable manner among devices in the WLAN and or in the cloud.

Figure 2:
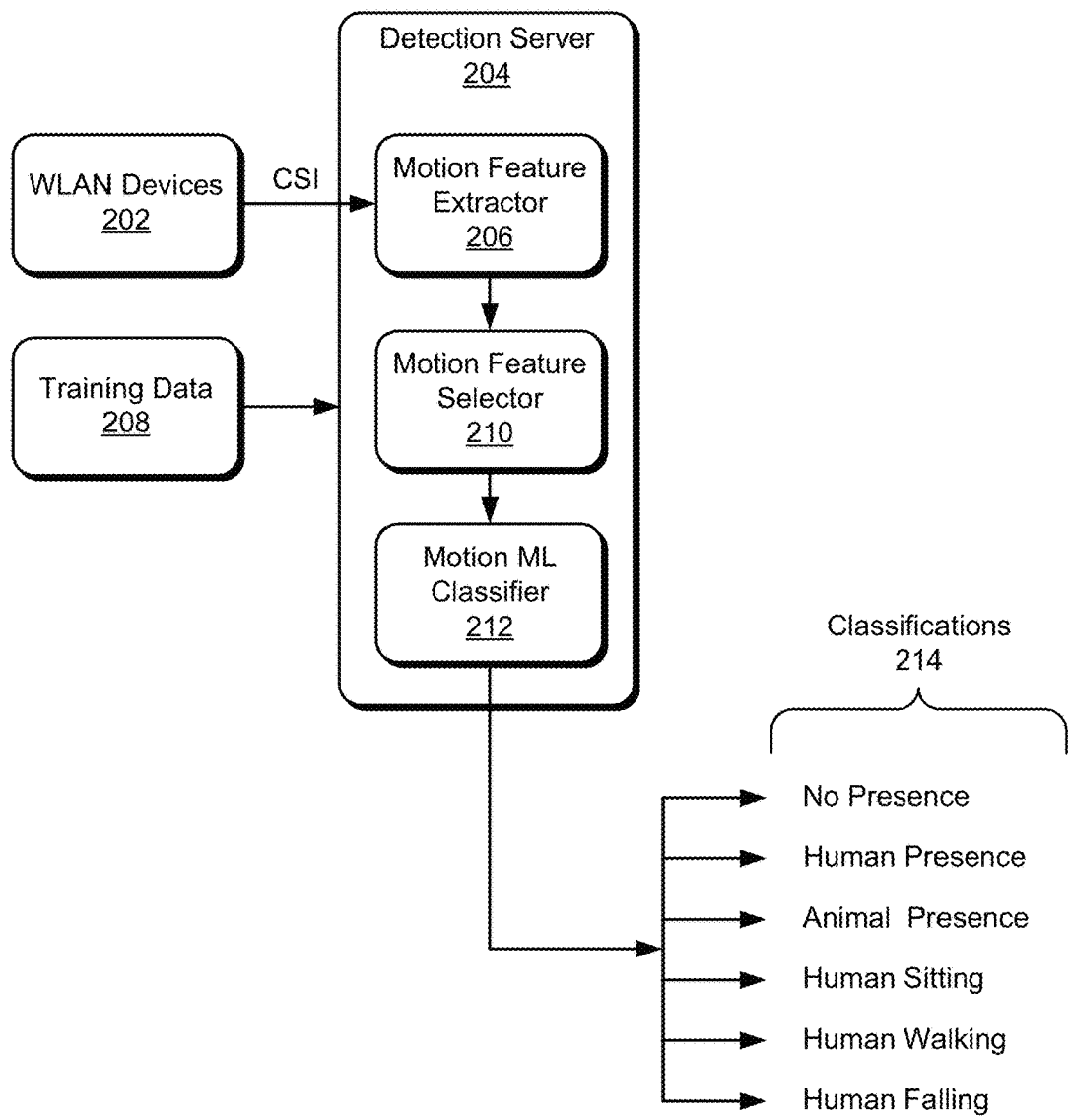
FIG. 2 illustrates an example system in which various aspects and techniques of motion detection using wireless local area networks can be implemented.

FIG. 2 illustrates an example system 200 in which various aspects and techniques of motion detection using wireless local area networks can be implemented. The system 200 includes WLAN devices 202 and the detection server 204 to illustrate processing radio signal spectrograms and channel state information (CSI) to detect and classify presence and motion behaviors.

As described above, the detection server 204 aggregates the radio signal spectrograms and CSI from the WLAN devices 202. Optionally or additionally, the radio signal spectrograms and CSI data may be preprocessed before feature extraction. For example, the preprocessing may include noise reduction, dimension reduction, or the like. In order for an ML model to use the channel-state-information (CSI) to classify among different motion classes, such as no-motion, human motion, and pet motion, an effective and efficient feature vector must be extracted from a sequence of CSI samples over a time interval. The required CSI feature vector must capture the granular pattern differences introduced onto CSIs by different motion classes. Consequently, the feature vector serves as the input to the downstream ML model which learns the different CSI patterns captured through the feature vector on different motion classes.

A motion feature extractor 206 performs a bi-projection feature extraction. The motion feature extractor 206 buffers the CSI on a two-dimensional plane, where the x-axis of the plane is a CSI sample index (time), and the y-axis of the plane is a subcarrier index (RF frequency). By way of example and not limitation, each CSI sample CSI(t) that is buffered includes 424 subcarriers. Each subcarrier is represented as a complex number which is a channel-response-coefficient of the RF channel for the particular subcarrier between a WLAN transmitter in a first WLAN device and a WLAN receiver in a second WLAN device. By way of example and not limitation, a buffer interval of 5 sec in time with a 20 Hz CSI sampling rate is used which results in a CSI buffer block of 424 subcarriers by 100 CSI samples in the frequency-time plane.

Conventional techniques that process CSI data using image-related feature extraction methods require larger input sets of CSI data and greater processing resources than techniques using statistics of CSI motion patterns, such as variance of CSI block in temporal and frequency domain, that directly correlate to the physical motion of human or object in space-time that introduce disturbances onto CSI. The correlation between the CSI temporal-frequency variance and the physical motion disturbing RF channel in space-time performed by the motion feature extractor 206 results in classifications using less data and fewer processing resources.

Training data 208 is provided to the detection server 204 to train the motion feature selector 210 and the motion machine learning (ML) classifier 212 to identify motion or presence that corresponds to one of the classifications 214, such as no presence, human presence, animal presence, human sitting, human walking, human falling, or the like. For example, the feature vectors extracted from the sequence of CSI samples are processed through two fully connected layers to identify motion or presence that corresponds to one of the classifications 214.

Sensing Systems

Figure 3:
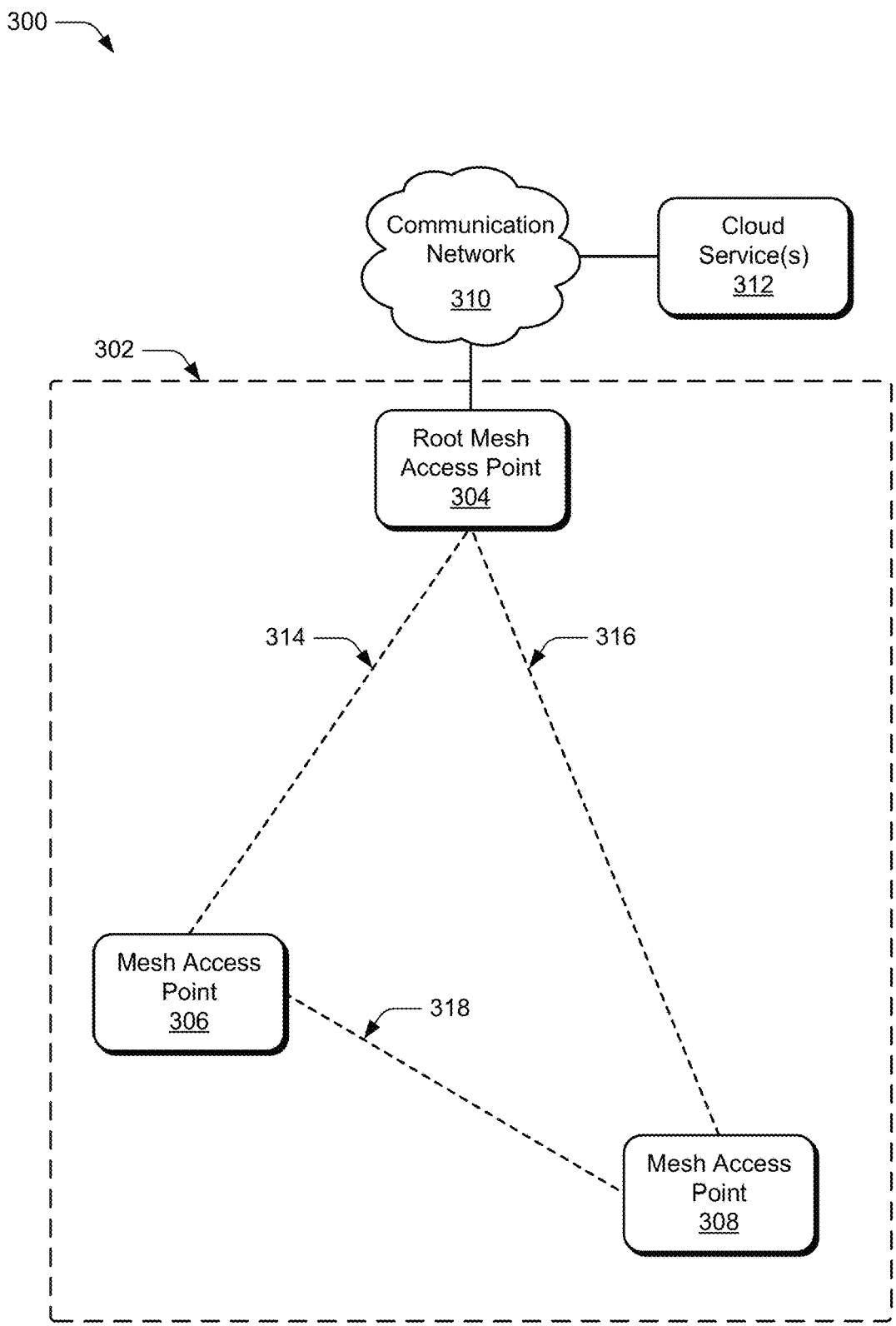
FIG. 3 illustrates an example system in which various aspects and techniques of motion detection using wireless local area networks can be implemented, as generally related to motion sensing by a mesh WLAN deployed in a structure.

FIG. 3 illustrates an example system 300 in which various aspects and techniques of motion detection using wireless local area networks can be implemented, as generally related to motion sensing by a mesh WLAN deployed in a structure 302. The mesh WLAN includes a root mesh access point 304, a mesh access point 306, and a mesh access point 308. The root mesh AP 304 connects the mesh WLAN to a communication network 310 (e.g., the Internet) and, in turn, to one or more cloud services 312, such as a cloud-based detection server 204, a smart-home cloud service, or the like. Although the mesh WLAN is illustrated with three mesh APs, any suitable number of mesh APs may be included in the mesh WLAN.

The root mesh AP 304 and the mesh APs 306 and 308 are interconnected by backhaul (or backbone) links 314, 316, and 318 that carry network traffic for client devices served by the APs to other client devices in the mesh WLAN or to nodes or services connected to the communication network 310. For example, the root mesh AP 304 can configure backhaul communications with and between the mesh APs 306 and 308 on a particular WLAN channel or in a particular WLAN RF frequency band (e.g., a 5 GHz radio band or a 2.4 GHz radio band). The root mesh AP 304 and the mesh APs 306 and 308 provide WLAN connectivity to WLAN client devices in the same radio band as the backhaul communications links, a different radio band than the backhaul communications links, or both.

The root mesh AP 304 schedules the periodic transmission of NDFs by the root mesh AP 304 and the mesh APs 306 and 308 across the backhaul links 314, 316, and 318 to acquire radio signal spectrogram and CSI data for motion classification. The root mesh AP 304 receives the acquired radio signal spectrogram and CSI data from the mesh APs 306 and 308. In one aspect, the root mesh AP 304 includes the detection server 204, aggregates the acquired radio signal spectrogram and CSI data, and performs the motion classification. The root mesh AP 304 sends classification result(s) to applications and services that consume the classification data, such as a smart-home cloud service, a security monitoring service, a security system hub in the structure 302, or the like.

In another aspect, the root mesh AP 304 aggregates the acquired radio signal spectrogram and CSI data and forwards the aggregated data to a cloud-based detection server 204. The cloud-based detection server 204 may be a service that performs the motion classification and provides the classification results to other applications, services, and/or devices, or the detection server 204 may be included as a component in another cloud-based service, such as a smart-home cloud service, a security monitoring service, or the like.

Figure 4:
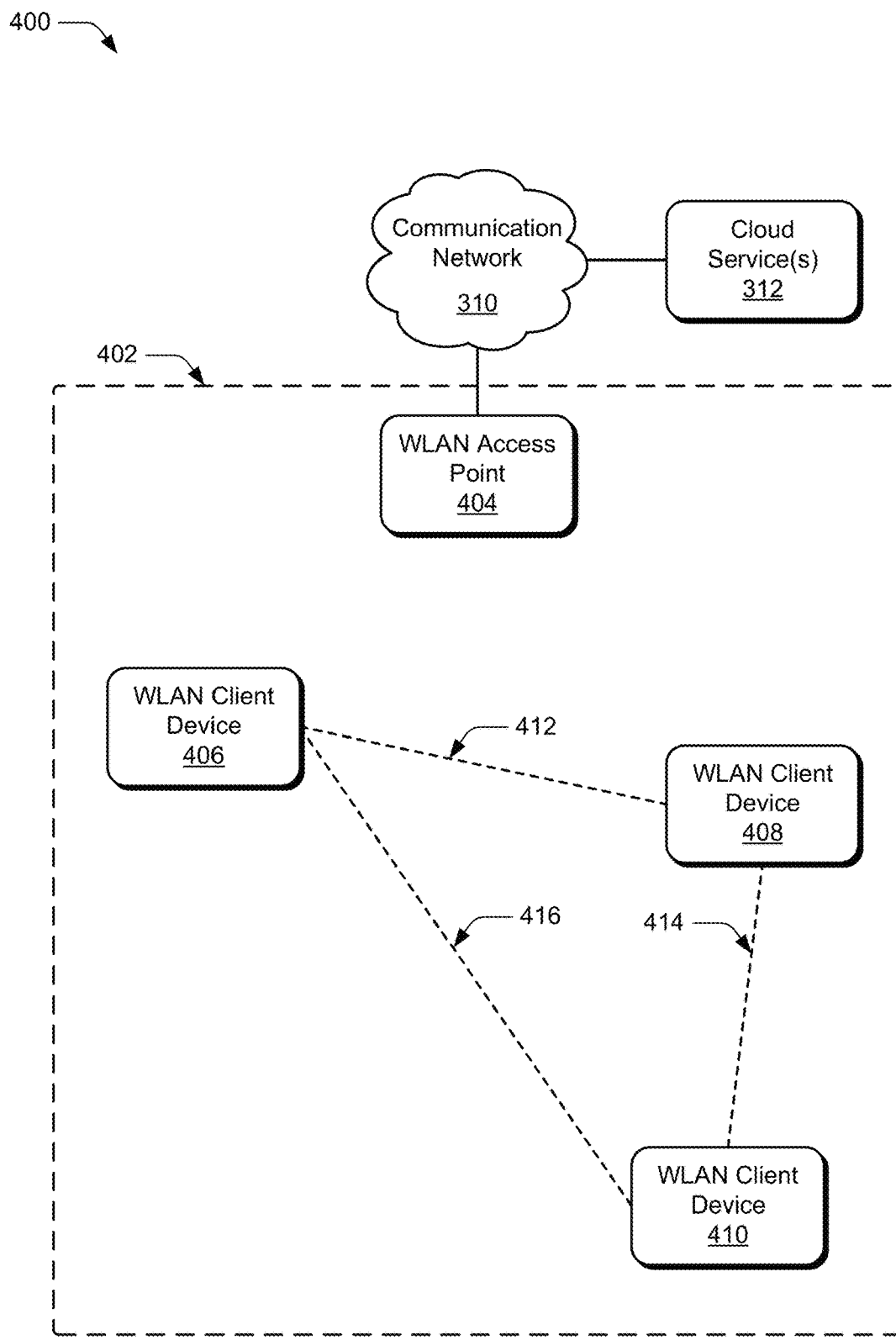
FIG. 4 illustrates an example system in which various aspects and techniques of motion detection using wireless local area networks can be implemented.

FIG. 4 illustrates an example system 400 in which various aspects and techniques of motion detection using wireless local area networks can be implemented, as generally related to motion sensing in a WLAN served by an access point without capabilities to configure NDF transmissions to acquire radio signal spectrograms and CSI and/or classify presence or motion from the acquired data. The WLAN is deployed in a structure 402 and includes a WLAN access point 404 that connects the WLAN to the communication network 310 and in turn to one or more cloud services 312, such as a cloud-based detection server 204, a smart-home cloud service, or the like.

The WLAN includes multiple WLAN client devices 406, 408, and 410 that are connected to WLAN by the WLAN AP 404. WLAN client devices may be mobile or nomadic, such as a laptop computer or a smartphone, or stationary, such as a media streaming device, a camera, a thermostat, a smart-speaker, or the like. Any WLAN client device can include the capability to schedule NDF transmissions for channel sounding, to aggregate acquired channel data, and/or to perform motion classification. For example, the WLAN client device 406 is a stationary device, such as a media streaming device attached to a television. The WLAN client device 406 determines that WLAN client devices 408 and 410 are also stationary devices. The WLAN client device 406 may make this determination in any suitable manner, such as transmitting NDFs over a period of time and determining that the devices are stationary, by determining a device type or identifier that indicates the devices are stationary, by querying a cloud service, such as a smart-home service, that can identify devices installed at the structure 402, or the like. The WLAN client device 406 schedules NDF transmissions to other stationary WLAN client devices, such as WLAN client devices 408 and 410 to acquire radio signal spectrograms and CSI.

Continuing with the example, the WLAN client device 406 may also determine that other WLAN client devices, such as WLAN client devices 408 and 410, can schedule NDF transmissions and acquire radio signal spectrograms and CSI, as illustrated at 412, 414, and 416. The WLAN client device 406 schedules NDF transmissions for the other client WLAN device and receives the radio signal spectrograms and CSI from the other WLAN client devices.

In one aspect, the WLAN client device 406 includes the detection server 204, aggregates the acquired radio signal spectrogram and CSI data, and performs the motion classification. The WLAN client device 406 sends to classification result(s) to applications and services that consume the classification data, such as a smart-home cloud service, a security monitoring service, a security system hub in the structure 402, or the like.

In another aspect, the WLAN client device 406 aggregates the acquired radio signal spectrogram and CSI data and forwards the aggregated data to a cloud-based detection server 204. The cloud-based detection server 204 may be a service that performs the motion classification and provides the classification results to other applications, services, and/or devices, or the detection server 204 may be included as a component in another cloud-based service, such as a smart-home cloud service, a security monitoring service, or the like.

Figure 5:
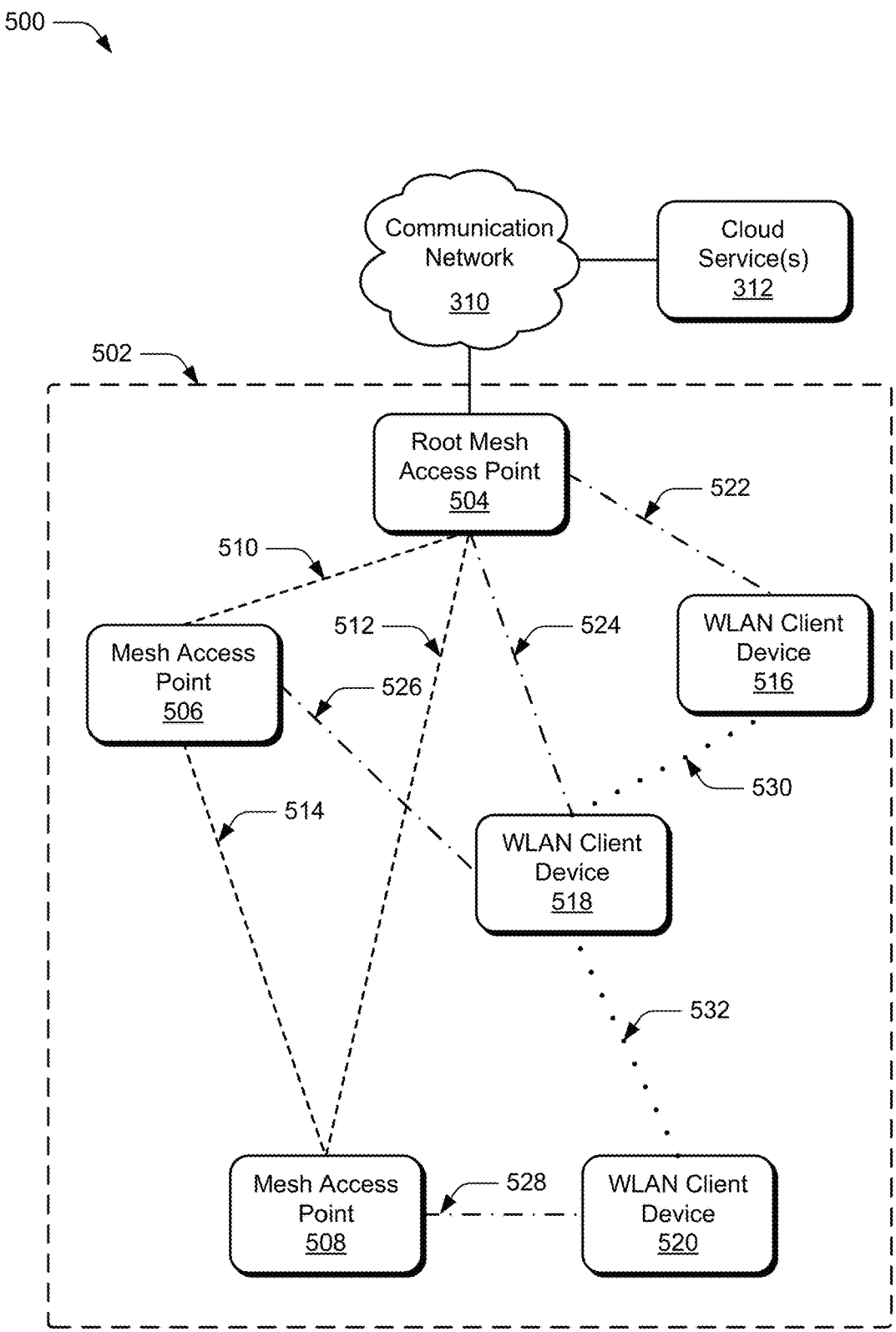
FIG. 5 illustrates an example system in which various aspects and techniques of motion detection using wireless local area networks can be implemented, as generally related to motion sensing by a mesh WLAN and WLAN client devices deployed in a structure.

FIG. 5 illustrates an example system 500 in which various aspects and techniques of motion detection using wireless local area networks can be implemented, as generally related to motion sensing by a mesh WLAN and WLAN client devices deployed in a structure 502. The mesh WLAN includes a root mesh access point 504, a mesh access point 506, and a mesh access point 508. The root mesh AP 504 connects the mesh WLAN to the communication network 310 and in turn to one or more cloud services 312, such as a cloud-based detection server 204, a smart-home cloud service, or the like. Although the mesh WLAN is illustrated with three mesh APs, any suitable number of mesh APs may be included in the mesh WLAN.

The root mesh AP 504 and the mesh APs 506 and 508 may operate using backhaul links 510, 512, and 514 (as illustrated by the dashed lines in FIG. 5) to acquire radio signal spectrogram and CSI data, as described with respect to FIG. 3, above. However, as illustrated in FIG. 5, the location of the root mesh AP 504 and the mesh APs 506 and 508 may provide limited coverage of the structure 502 either due to the placement of the mesh APs, the location, number, and composition of walls, floors, and ceilings in the structure 502, link budget limitations due to noise and interference, or the like.

In one aspect, the root mesh AP 504 schedules NDF transmissions to client WLAN devices 516, 518, 520 from the mesh WLAN APs to gather additional radio signal spectrograms and CSI for additional RF signal paths within the structure 502, as shown by the dash-dot lines at 522, 524, 526, and 528. Additionally or optionally, the root mesh AP 504 determines that one or more of the WLAN client devices, in this example the WLAN client device 518, has the capability to perform scheduled NDF transmissions and acquire radio signal spectrograms and CSI. The root mesh AP 504 configures the WLAN client device 518 to periodically transmit NDFs to the client devices 516 and 520, as shown by the dotted lines 530 and 532, and acquires radio signal spectrograms and CSI.

By including additional RF signal paths between the additional WLAN devices and/or the APs, additional radio signal spectrogram and CSI data is available to improve coverage and accuracy of feature extraction and classification for presence and motion detection. The root mesh AP 504 can schedule the NDF transmissions in a suitable radio band, channel, or combination of radio bands and channels between the mesh WLAN APs and WLAN client devices. The root mesh AP 504 can schedule the NDF transmissions based on the capabilities of the mesh WLAN APs and WLAN client devices, RF signal propagation characteristics in the structure 502, to improve link budgets for NDF transmissions, or the like.

In a further aspect, in system 400 or 500, there may be WLAN client devices that are capable (e.g., devices that include compatible hardware and a compatible networking stack) of performing scheduled NDF transmissions and acquiring radio signal spectrograms and CSI but lack higher layer software to perform these operations. These WLAN client devices can be updated with the capabilities of performing scheduled NDF transmissions and acquiring radio signal spectrograms and CSI by upgrading the software of the device, such as by downloading an updated software image to the device.

The decision to update WLAN client devices for motion and presence detection may be based on a variety of factors. For example, the detection server 204 may determine that the success rate for classification is below a threshold. Based on the determination, the detection server 204 may provide a user notification (e.g., via an email, text message, in-app notification, or the like) to the user that indicates that the classification accuracy can be improved by adding additional, motion-detection-capable WLAN devices. An application, such a smart-home application on a user device, can be triggered to search for capable devices to upgrade, to trigger the root mesh WLAN AP to search for capable devices to upgrade, or to query a cloud-service, such as a smart-home cloud service that maintains a list of WLAN client devices installed in the structure. Based on receiving the query, the cloud-service determines which WLAN client devices can be upgraded and provides a notification to the user so that the user can initiate the upgrades or, alternatively, the cloud-based service can push the software upgrade to the target devices without further user intervention.

In an aspect, updating WLAN client devices for motion and presence detection may be triggered by adding a device to the WLAN. For example, adding a security hub device to a smart-home system in the structure may trigger a smart-home cloud service connected to the smart-home system to determine to push updated software images to other devices in the smart-home system to enable or improve motion and presence detection for use by the security functions in the security hub device and smart-home system.

In another aspect, adding a monitoring service, such as a security-monitoring service, to a smart-home system can trigger updating WLAN client devices for motion and presence detection. For example, adding the security-monitoring service to a smart-home system in the structure may trigger a smart-home cloud service, connected to the smart-home system, to determine to push updated software images to other devices in the smart-home system to enable or improve motion and presence detection for use by the security-monitoring service that uses the smart-home system.

Example Methods

Example methods 600 and 700 are described with reference to FIGS. 6 and 7 in accordance with one or more aspects of motion detection using wireless local area networks. The order in which the method blocks are described is not intended to be construed as a limitation, and any number of the described method blocks can be combined in any order or skipped to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 6:
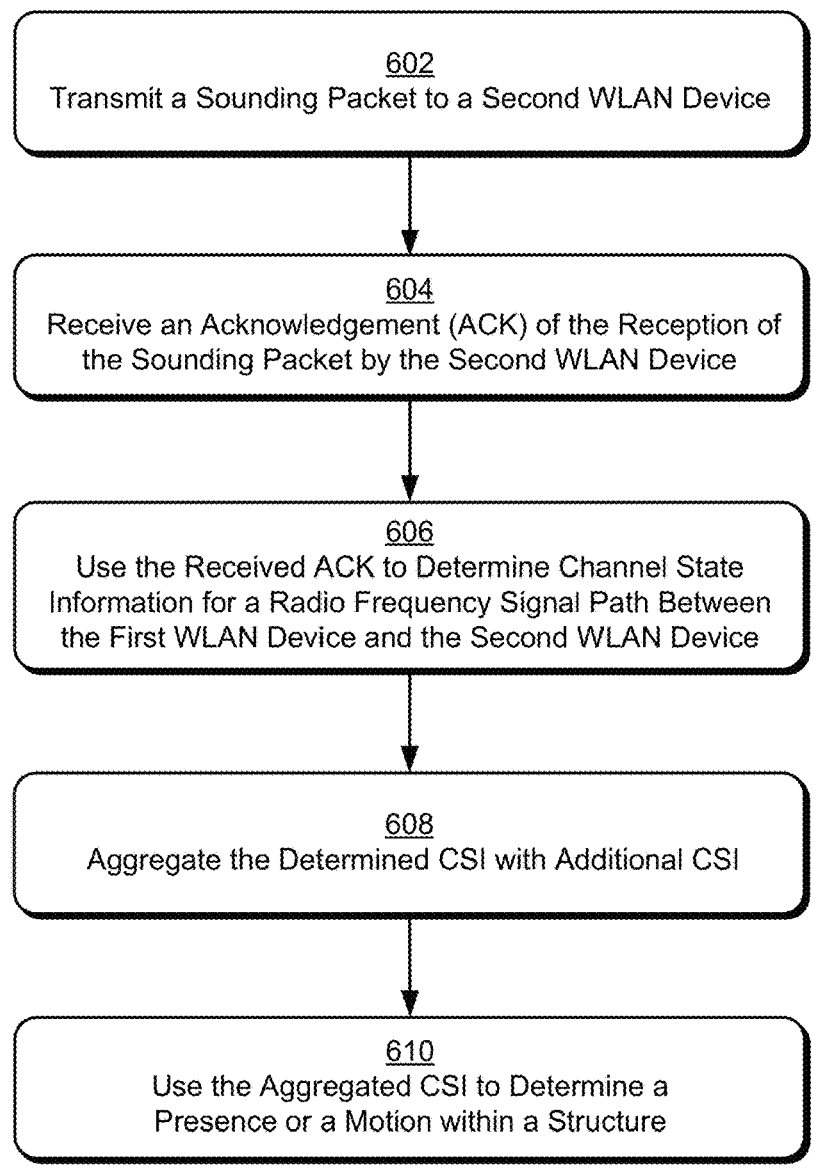
FIG. 6 illustrates an example method of motion detection using wireless local area networks as in accordance with aspects of the techniques described herein.

FIG. 6 illustrates example method(s) 600 of motion detection using wireless local area networks as generally related to a WLAN device in a WLAN network. At block 602, a first WLAN device (e.g., WLAN device 202) transmits a sounding packet to a second WLAN device (e.g., WLAN device 202).

At block 604, the first WLAN device receives, from the second WLAN device, an acknowledgement (ACK) of receiving the sounding packet by the second WLAN device.

At block 606, the first WLAN device uses the received ACK to determine Channel State Information (CSI) for a radio frequency (RF) signal path between the first WLAN device and the second WLAN device.

At block 608, the first WLAN device aggregates the determined CSI with additional CSI.

At block 610, the first WLAN device uses the aggregated CSI to determine a presence or a motion within a structure.

Figure 7:
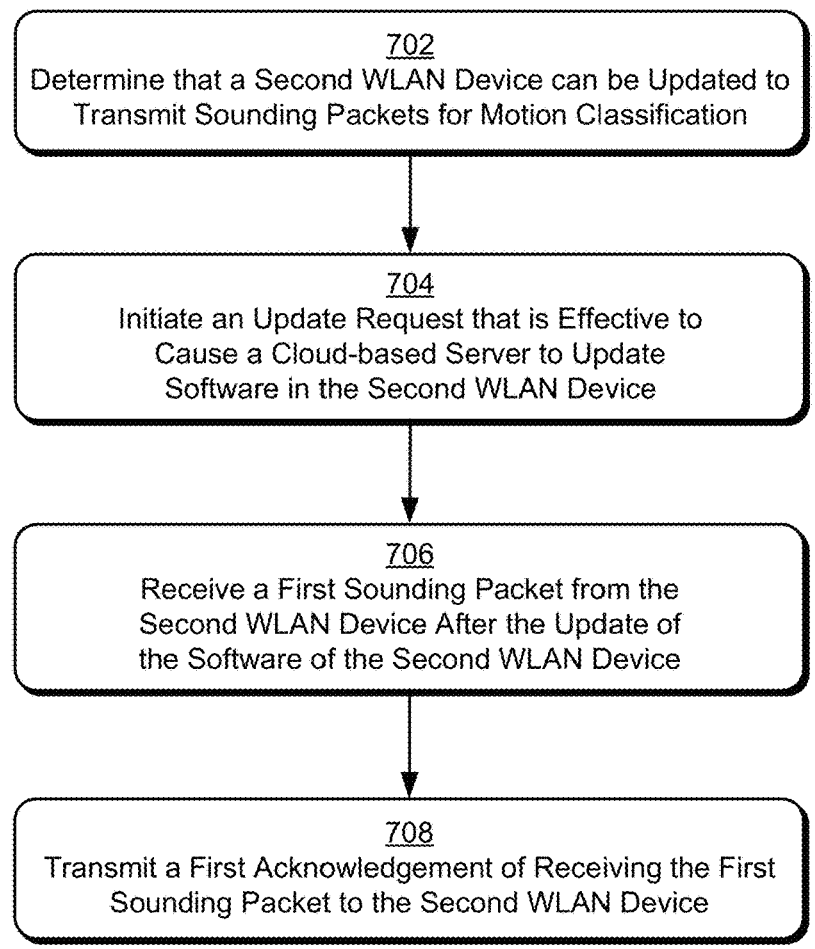
FIG. 7 illustrates an example method of motion detection using wireless local area networks in accordance with aspects of the techniques described herein.

FIG. 7 illustrates example method(s) 700 of motion detection using wireless local area networks as generally related to a WLAN device in a WLAN network. At block 702, the WLAN device (e.g., WLAN device 202) determines that a second WLAN device can be updated to transmit sounding packets for motion classification.

At block 704, the first WLAN device initiates an update request that is effective to cause a cloud-based server (e.g., the cloud service 312) to update software in the second WLAN device.

At block 706, the first WLAN device receives a first sounding packet from the second WLAN device after the update of the software of the second WLAN device.

At block 708, the first WLAN device transmits a first acknowledgement (ACK) of receiving the first sounding packet to the second WLAN device, the transmitting being effective to cause the second WLAN device to determine Channel State Information (CSI) for a radio frequency (RF) signal path between the first WLAN device.

Example Environments and Devices

Figure 8:
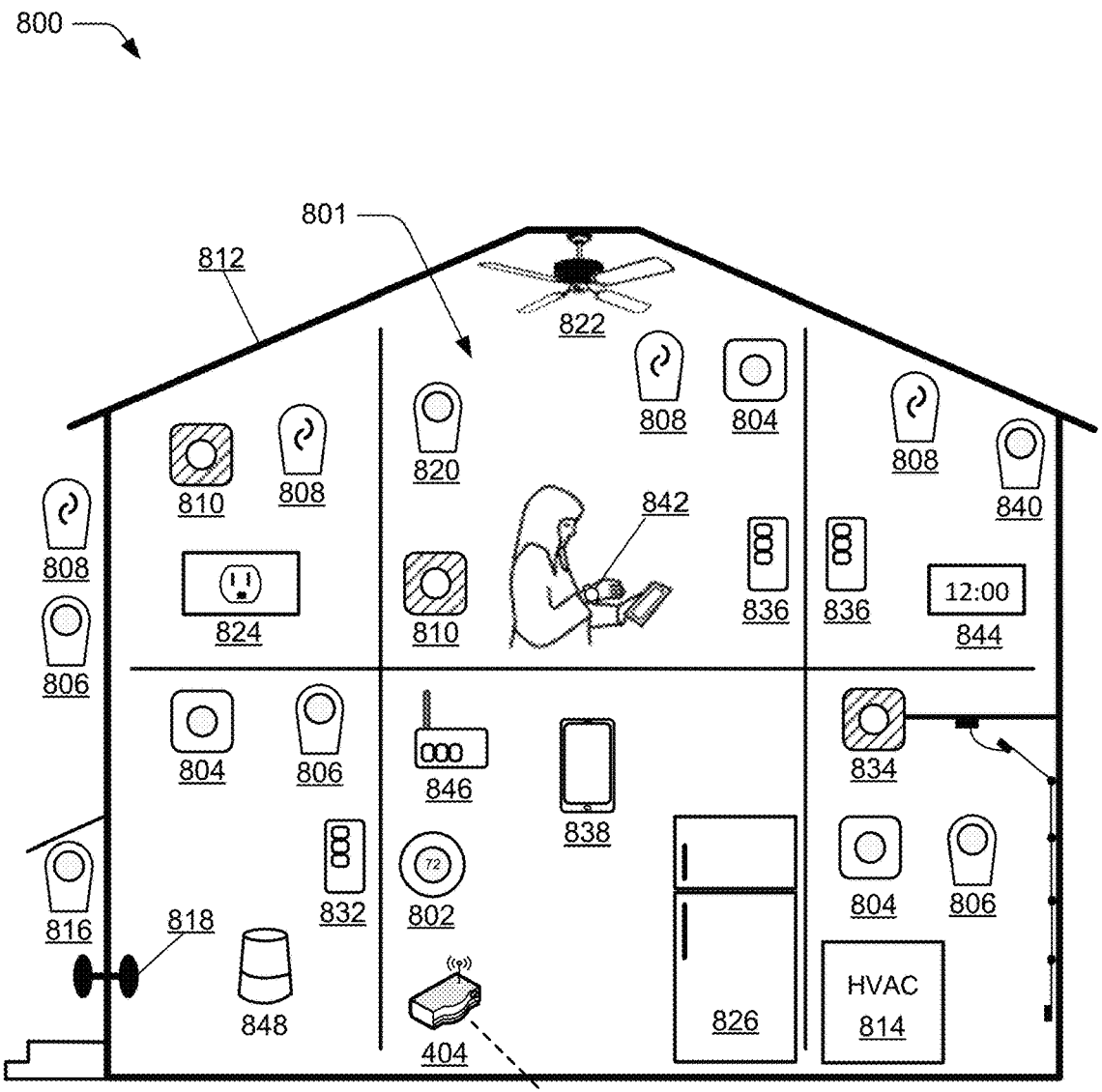
FIG. 8 illustrates an example environment in which a WLAN can be implemented in accordance with aspects of the techniques described herein.

FIG. 8 illustrates an example environment 800 in which aspects of motion detection using wireless local area networks can be implemented. Generally, the environment 800 includes a WLAN 801, implemented as part of a smart-home or other type of structure with any number of WLAN devices 202 that are configured for communication in a WLAN. For example, the WLAN devices can include a thermostat 802, hazard detectors 804 (e.g., for smoke and/or carbon monoxide), cameras 806 (e.g., indoor and outdoor), lighting units 808 (e.g., indoor and outdoor), and any other types of WLAN devices 810 that are implemented inside and/or outside of a structure 812 (e.g., in a smart-home environment). In this example, the WLAN devices can also include any of the previously described devices.

In the environment 800, any number of the WLAN devices 810 can be implemented for wireless interconnection to wirelessly communicate and interact with each other. The WLAN devices 810 are modular, intelligent, multi-sensing, network-connected devices that can integrate seamlessly with each other and/or with a central server or a cloud-computing system to provide any of a variety of useful smart-home objectives and implementations. An example of a WLAN device 810 that can be implemented as any of the devices described herein is shown and described with reference to FIG. 9.

In implementations, the thermostat 802 may include a Nest® Learning Thermostat that detects ambient climate characteristics (e.g., temperature and/or humidity) and controls a HVAC system 814 in the smart-home environment. The learning thermostat 802 and other smart devices "learn" by capturing occupant settings to the devices. For example, the thermostat learns preferred temperature set-points for mornings and evenings, and when the occupants of the structure are asleep or awake, as well as when the occupants are typically away or at home.

A hazard detector 804 can be implemented to detect the presence of a hazardous substance or a substance indicative of a hazardous substance (e.g., smoke, fire, or carbon monoxide). In examples of wireless interconnection, a hazard detector 804 may detect the presence of smoke, indicating a fire in the structure, in which case the hazard detector that first detects the smoke can broadcast a low-power wake-up signal to all of the connected WLAN devices. The other hazard detectors 804 can then receive the broadcast wake-up signal and initiate a high-power state for hazard detection and to receive wireless communications of alert messages. Further, the lighting units 808 can receive the broadcast wake-up signal and activate in the region of the detected hazard to illuminate and identify the problem area. In another example, the lighting units 808 may activate in one illumination color to indicate a problem area or region in the structure, such as for a detected fire or break-in, and activate in a different illumination color to indicate safe regions and/or escape routes out of the structure.

In various configurations, the WLAN devices 810 can include an entryway interface device 816 that functions in coordination with a network-connected door lock system 818, and that detects and responds to a person's approach to or departure from a location, such as an outer door of the structure 812. The entryway interface device 816 can interact with the other WLAN devices based on whether someone has approached or entered the smart-home environment. An entryway interface device 816 can control doorbell functionality, announce the approach or departure of a person via audio or visual means, and control settings on a security system, such as to activate or deactivate the security system when occupants come and go. The WLAN devices 810 can also include other sensors and detectors, such as to detect ambient lighting conditions, detect room-occupancy states (e.g., with an occupancy sensor 820), and control a power and/or dim state of one or more lights. In some instances, the sensors and/or detectors may also control a power state or speed of a fan, such as a ceiling fan 822. Further, the sensors and/or detectors may detect occupancy in a room or enclosure and control the supply of power to electrical outlets or devices 824, such as if a room or the structure is unoccupied.

The WLAN devices 810 may also include connected appliances and/or controlled systems 826, such as refrigerators, stoves and ovens, washers, dryers, air conditioners, pool heaters 828, irrigation systems 830, security systems 832, and so forth, as well as other electronic and computing devices, such as televisions, entertainment systems, computers, intercom systems, garage-door openers 834, ceiling fans 822, control panels 836, and the like. When plugged in, an appliance, device, or system can announce itself to the WLAN as described above and can be automatically integrated with the controls and devices of the WLAN, such as in the smart-home. It should be noted that the WLAN devices 810 may include devices physically located outside of the structure, but within wireless communication range, such as a device controlling a swimming pool heater 828 or an irrigation system 830.

As described above, the WLAN includes a WLAN access point (e.g., AP 304, 404, or 504) that interfaces for communication with an external network, outside the WLAN. The access point connects to the communication network 310, such as the Internet. A cloud service 312, which is connected via the communication network 310, provides services related to and/or using the devices within the WLAN. By way of example, the cloud service 312 can include applications for connecting end user devices 838, such as smart phones, tablets, and the like, to devices in the WLAN, processing and presenting data acquired in the WLAN to end users, linking devices in one or more WLANs to user accounts of the cloud service 312, provisioning and updating devices in the WLAN, and so forth. For example, a user can control the thermostat 802 and other WLAN devices in the smart-home environment using a network-connected computer or portable device, such as a mobile phone or tablet device. Further, the WLAN devices can communicate information to any central server or cloud-computing system via the access point 404. The data communications can be carried out using any of a variety of custom or standard wireless protocols (e.g., IEEE 802.11, Wi-Fi, ZigBee, Z-Wave, 6LoWPAN, Thread, etc.) and/or by using any of a variety of custom or standard wired protocols (CAT6 Ethernet, HomePlug, etc.).

Any of the WLAN devices in the WLAN can serve as low-power and communication nodes to create the WLAN in the smart-home environment. Individual low-power nodes of the network can regularly send out messages regarding what they are sensing, and the other low-powered nodes in the environment—in addition to sending out their own messages—can repeat the messages, thereby communicating the messages from node to node (i.e., from device to device) throughout the WLAN. The WLAN devices can be implemented to conserve power, particularly when battery-powered, utilizing low-powered communication protocols to receive the messages, translate the messages to other communication protocols, and send the translated messages to other nodes and/or to a central server or cloud-computing system. For example, an occupancy and/or ambient light sensor can detect an occupant in a room as well as measure the ambient light, and activate the light source when the ambient light sensor 840 detects that the room is dark and when the occupancy sensor 820 detects that someone is in the room. Further, the sensor can include a low-power wireless communication chip (e.g., an IEEE 802.11 chip) that regularly sends out messages regarding the occupancy of the room and the amount of light in the room, including instantaneous messages coincident with the occupancy sensor detecting the presence of a person in the room. As mentioned above, these messages may be sent wirelessly, using the WLAN, from node to node (i.e., smart device to smart device) within the smart-home environment as well as over the Internet to a central server or cloud-computing system.

In other configurations, various ones of the WLAN devices can function as "tripwires" for an alarm system in the smart-home environment. For example, in the event a perpetrator circumvents detection by alarm sensors located at windows, doors, and other entry points of the structure or environment, the alarm could still be triggered by receiving an occupancy, motion, heat, sound, etc. message from one or more of the low-powered mesh nodes in the WLAN. In other implementations, the WLAN can be used to automatically turn on and off the lighting units 808 as a person transitions from room to room in the structure. For example, the WLAN devices can detect the person's movement through the structure and communicate corresponding messages via the nodes of the WLAN. Using the messages that indicate which rooms are occupied, other WLAN devices that receive the messages can activate and/or deactivate accordingly. As referred to above, the WLAN can also be utilized to provide exit lighting in the event of an emergency, such as by turning on the appropriate lighting units 808 that lead to a safe exit. The light units 808 may also be turned-on to indicate the direction along an exit route that a person should travel to safely exit the structure.

The various WLAN devices may also be implemented to integrate and communicate with wearable computing devices 842, such as may be used to identify and locate an occupant of the structure, and adjust the temperature, lighting, sound system, and the like accordingly. In other implementations, RFID sensing (e.g., a person having an RFID bracelet, necklace, or key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., a person wearing an infrared or NFC-capable smartphone), along with rules-based inference engines or artificial intelligence techniques that draw useful conclusions from the sensed information as to the location of an occupant in the structure or environment.

In other implementations, personal comfort-area networks, personal health-area networks, personal safety-area networks, and/or other such human-facing functionalities of service robots can be enhanced by logical integration with other WLAN devices and sensors in the environment according to rules-based inferencing techniques or artificial intelligence techniques for achieving better performance of these functionalities. In an example relating to a personal health-area, the system can detect whether a household pet is moving toward the current location of an occupant (e.g., using any of the WLAN devices and sensors), along with rules-based inferencing and artificial intelligence techniques. Similarly, a hazard detector service robot can be notified that the temperature and humidity levels are rising in a kitchen, and temporarily raise a hazard detection threshold, such as a smoke detection threshold, under an inference that any small increases in ambient smoke levels will most likely be due to cooking activity and not due to a genuinely hazardous condition. Any service robot that is configured for any type of monitoring, detecting, and/or servicing can be implemented as a mesh node device on the WLAN, conforming to the wireless interconnection protocols for communicating on the WLAN.

The WLAN devices 810 may also include a smart alarm clock 844 for each of the individual occupants of the structure in the smart-home environment. For example, an occupant can customize and set an alarm device for a wake time, such as for the next day or week. Artificial intelligence can be used to consider occupant responses to the alarms when they go off and make inferences about preferred sleep patterns over time. An individual occupant can then be tracked in the WLAN based on a unique signature of the person, which is determined based on data obtained from sensors located in the WLAN devices, such as sensors that include ultrasonic sensors, passive IR sensors, and the like. The unique signature of an occupant can be based on a combination of patterns of movement, voice, height, size, etc., as well as using facial recognition techniques.

In an example of wireless interconnection, the wake time for an individual can be associated with the thermostat 802 to control the HVAC system in an efficient manner so as to pre-heat or cool the structure to desired sleeping and awake temperature settings. The preferred settings can be learned over time, such as by capturing the temperatures set in the thermostat before the person goes to sleep and upon waking up. Collected data may also include biometric indications of a person, such as breathing patterns, heart rate, movement, etc., from which inferences are made based on this data in combination with data that indicates when the person actually wakes up. Other WLAN devices can use the data to provide other smart-home objectives, such as adjusting the thermostat 802 so as to pre-heat or cool the environment to a desired setting, and turning-on or turning-off the lights 808.

In implementations, the WLAN devices can also be utilized for sound, vibration, and/or motion sensing such as to detect running water and determine inferences about water usage in a smart-home environment based on algorithms and mapping of the water usage and consumption. This can be used to determine a signature or fingerprint of each water source in the home, and is also referred to as "audio fingerprinting water usage." Similarly, the WLAN devices can be utilized to detect the subtle sound, vibration, and/or motion of unwanted pests, such as mice and other rodents, as well as by termites, cockroaches, and other insects. The system can then notify an occupant of the suspected pests in the environment, such as with warning messages to help facilitate early detection and prevention.

The environment 800 may include one or more WLAN devices that function as a hub 846. The hub 846 may be a general-purpose home automation hub, or an application-specific hub, such as a security hub, an energy management hub, an HVAC hub, and so forth. The functionality of a hub 846 may also be integrated into any WLAN device, such as a smart thermostat device or a smart speaker 848. Hosting functionality on the hub 846 in the structure 812 can improve reliability when the user's internet connection is unreliable, can reduce latency of operations that would normally have to connect to the cloud service 312, and can satisfy system and regulatory constraints around local access between WLAN devices.

Additionally, the example environment 800 includes the smart-speaker 848. The smart-speaker 848 provides voice assistant services that include providing voice control of smart-home devices. The functions of the hub 846 may be hosted in the smart-speaker 848. The smart-speaker 848 can be configured to communicate via the WLAN, ZigBee, Z-Wave, Thread, or any combination thereof.

Figure 9:
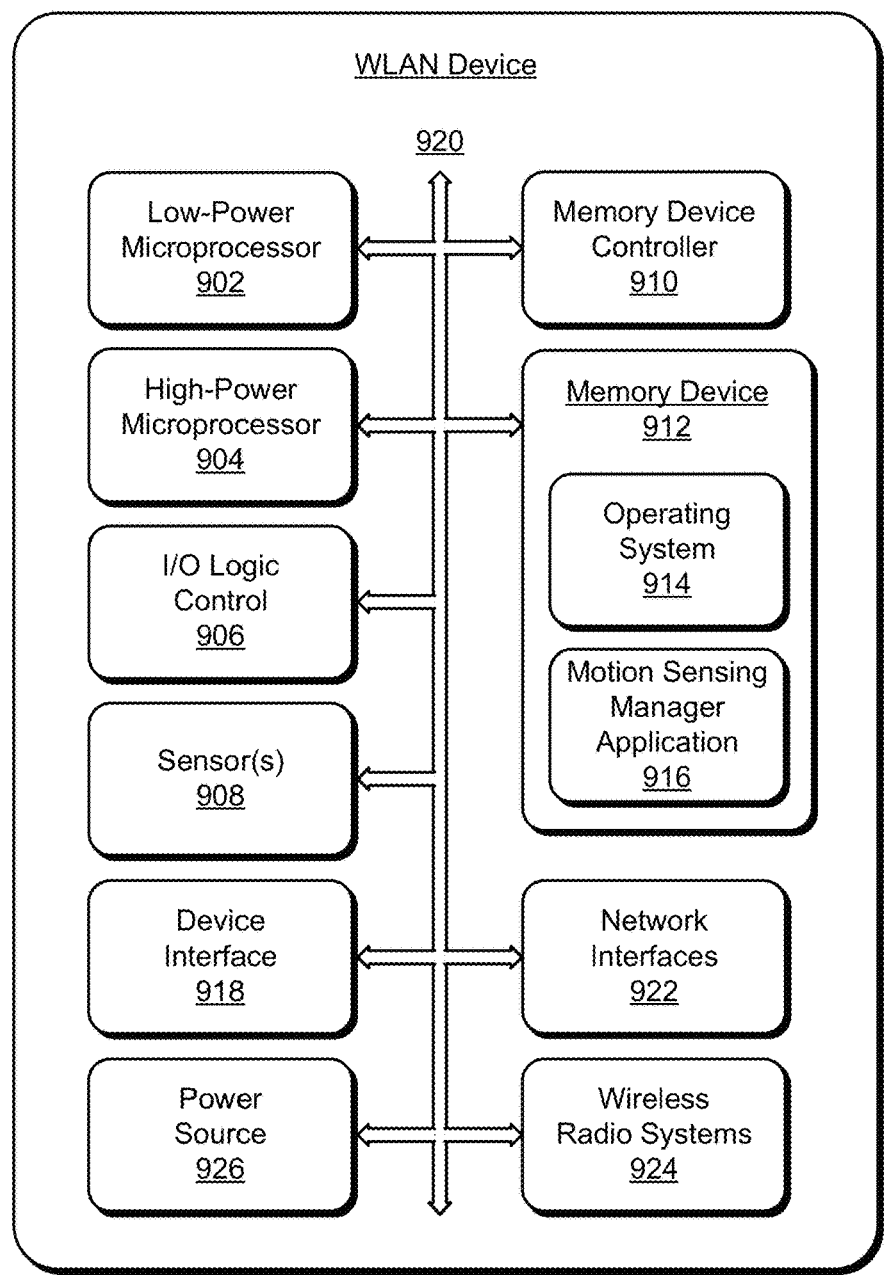
FIG. 9 illustrates an example WLAN device that can be implemented in a WLAN environment in accordance with one or more aspects of the techniques described herein.

FIG. 9 illustrates an example WLAN device 900 that can be implemented as any of the WLAN devices in a WLAN in accordance with one or more aspects of motion detection using wireless local area networks as described herein. The device 900 can be integrated with electronic circuitry, microprocessors, memory, input output (I/O) logic control, communication interfaces and components, as well as other hardware, firmware, and/or software to implement the device in a WLAN. Further, the WLAN device 900 can be implemented with various components, such as with any number and combination of different components as further described with reference to the example device shown in FIG. 8.

In this example, the WLAN device 900 includes a low-power microprocessor 902 and a high-power microprocessor 904 (e.g., microcontrollers or digital signal processors) that process executable instructions. The device also includes an input-output (I/O) logic control 906 (e.g., to include electronic circuitry). The microprocessors can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The low-power microprocessor 902 and the high-power microprocessor 904 can also support one or more different device functionalities of the device. For example, the high-power microprocessor 904 may execute computationally intensive operations, whereas the low-power microprocessor 902 may manage less complex processes such as detecting a hazard or temperature from one or more sensors 908. The low-power processor 902 may also wake or initialize the high-power processor 904 for computationally intensive processes.

The one or more sensors 908 can be implemented to detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio frequency (RF), other electromagnetic signals or fields, or the like. As such, the sensors 908 may include any one or a combination of temperature sensors, humidity sensors, hazard-related sensors, other environmental sensors, accelerometers, microphones, optical sensors up to and including cameras (e.g., charged coupled-device or video cameras, active or passive radiation sensors, GPS receivers, and radio frequency identification detectors. In implementations, the WLAN device 900 may include one or more primary sensors, as well as one or more secondary sensors, such as primary sensors that sense data central to the core operation of the device (e.g., sensing a temperature in a thermostat or sensing smoke in a smoke detector), while the secondary sensors may sense other types of data (e.g., motion, light or sound), which can be used for energy-efficiency objectives or smart-operation objectives.

The WLAN device 900 includes a memory device controller 910 and a memory device 912, such as any type of a nonvolatile memory and/or other suitable electronic data storage device. The WLAN device 900 can also include various firmware and/or software, such as an operating system 914 that is maintained as computer executable instructions by the memory and executed by a microprocessor. The device software may also include a motion sensing manager application 916 that implements aspects of motion detection using wireless local area networks. The WLAN device 900 also includes a device interface 918 to interface with another device or peripheral component, and includes an integrated data bus 920 that couples the various components of the WLAN device for data communication between the components. The data bus in the WLAN device may also be implemented as any one or a combination of different bus structures and/or bus architectures.

The device interface 918 may receive input from a user and/or provide information to the user (e.g., as a user interface), and a received input can be used to determine a setting. The device interface 918 may also include mechanical or virtual components that respond to a user input. For example, the user can mechanically move a sliding or rotatable component, or the motion along a touchpad may be detected, and such motions may correspond to a setting adjustment of the device. Physical and virtual movable user-interface components can allow the user to set a setting along a portion of an apparent continuum. The device interface 918 may also receive inputs from any number of peripherals, such as buttons, a keypad, a switch, a microphone, and an imager (e.g., a camera device).

The WLAN device 900 can include network interfaces 922, such as a WLAN interface for communication with other WLAN devices in a WLAN network, and an external network interface for network communication, such as via the Internet. The WLAN device 900 also includes wireless radio systems 924 for wireless communication with other WLAN devices via the WLAN interface and for multiple, different wireless communications systems. The wireless radio systems 924 may include IEEE 802.11, Wi-Fi, ZigBee, Z-Wave, Thread, Bluetooth™, Mobile Broadband, BLE, and/or IEEE 802.15.4. Each of the different radio systems can include a radio device, antenna, and chipset that is implemented for a particular wireless communications technology. The WLAN device 900 also includes a power source 926, such as a battery and/or to connect the device to line voltage. An AC power source may also be used to charge the battery of the device.

Figure 10:
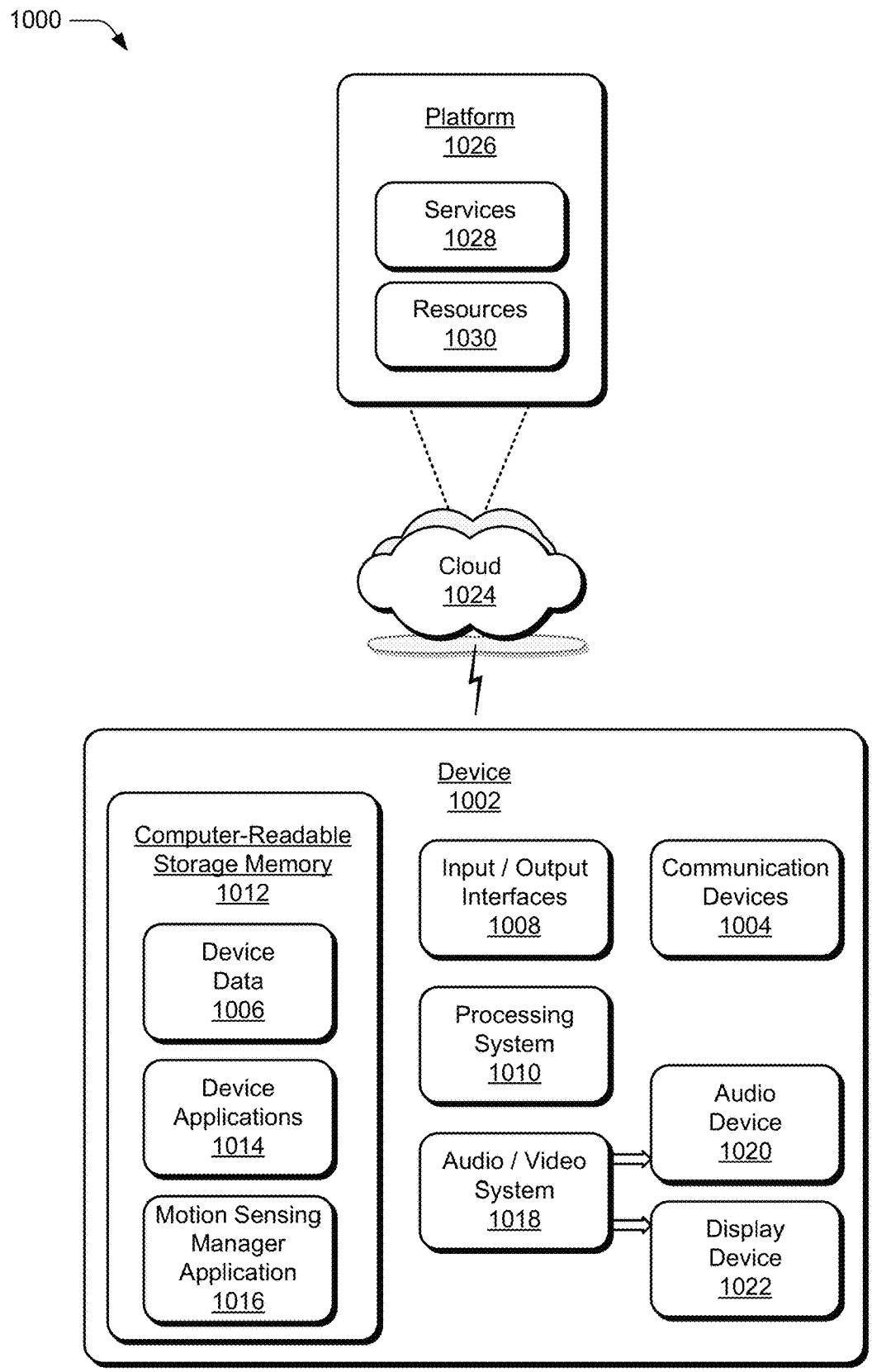
FIG. 10 illustrates an example system with an example device that can implement aspects of motion detection using wireless local area networks.

FIG. 10 illustrates an example system 1000 that includes an example device 1002, which can be implemented as any of the WLAN devices that implement aspects of motion detection using wireless local area networks as described with reference to the previous FIGS. 1-9. The example device 1002 may be any type of computing device, client device, mobile phone, tablet, communication, entertainment, gaming, media playback, and/or other type of device. Further, the example device 1002 may be implemented as any other type of WLAN device that is configured for communication on a WLAN, such as a thermostat, hazard detector, camera, light unit, commissioning device, router, border router, joiner router, joining device, end device, leader, access point, and/or other WLAN devices.

The device 1002 includes communication devices 1004 that enable wired and/or wireless communication of device data 1006, such as data that is communicated between the devices in a WLAN, data that is being received, data scheduled for broadcast, data packets of the data, data that is synched between the devices, etc. The device data can include any type of communication data, as well as audio, video, and/or image data that is generated by applications executing on the device. The communication devices 1004 can also include transceivers for cellular phone communication and/or for network data communication.

The device 1002 also includes input/output (I/O) interfaces 1008, such as data network interfaces that provide connection and/or communication links between the device, data networks (e.g., a mesh network, external network, etc.), and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of communication data, as well as audio, video, and/or image data received from any content and/or data source.

The device 1002 includes a processing system 1010 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 1002 may further include any type of a system bus or other data and command transfer system that couples the various components within the device. A system bus can include any one or combination of different bus structures and architectures, as well as control and data lines.

The device 1002 also includes computer-readable storage memory 1012, such as data storage devices that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory in various memory device configurations.

The computer-readable storage memory 1012 provides storage of the device data 1006 and various device applications 1014, such as an operating system that is maintained as a software application with the computer-readable storage memory and executed by the processing system 1010. The device applications may also include a device manager, such as any form of a control application, software application, signal processing and control module, code that is native to a particular device, a hardware abstraction layer for a particular device, and so on. In this example, the device applications also include a motion sensing manager application 1016 that implements aspects of motion detection using wireless local area networks, such as when the example device 1002 is implemented as any of the WLAN devices described herein.

The device 1002 also includes an audio and/or video system 1018 that generates audio data for an audio device 1020 and/or generates display data for a display device 1022. The audio device and/or the display device include any devices that process, display, and/or otherwise render audio, video, display, and/or image data, such as the image content of a digital photo. In implementations, the audio device and/or the display device are integrated components of the example device 1002. Alternatively, the audio device and/or the display device are external, peripheral components to the example device. In aspects, at least part of the techniques described for motion detection using wireless local area networks may be implemented in a distributed system, such as over a "cloud" 1024 in a platform 1026. The cloud 1024 includes and/or is representative of the platform 1026 for services 1028 and/or resources 1030.

The platform 1026 abstracts underlying functionality of hardware, such as server devices (e.g., included in the services 1028) and/or software resources (e.g., included as the resources 1030), and connects the example device 1002 with other devices, servers, etc. The resources 1030 may also include applications and/or data that can be utilized while computer processing is executed on servers that are remote from the example device 1002. Additionally, the services 1028 and/or the resources 1030 may facilitate subscriber network services, such as over the Internet, a cellular network, or Wi-Fi network. The platform 1026 may also serve to abstract and scale resources to service a demand for the resources 1030 that are implemented via the platform, such as in an interconnected device aspect with functionality distributed throughout the system 1000. For example, the functionality may be implemented in part at the example device 1002 as well as via the platform 1026 that abstracts the functionality of the cloud 1024.

Although aspects of motion detection using wireless local area networks have been described in language specific to features and/or methods, the subject of the appended claims is not necessarily limited to the specific features or methods described. Rather, the specific features and methods are disclosed as example implementations of motion detection using wireless local area networks, and other equivalent features and methods are intended to be within the scope of the appended claims. Further, various different aspects are described, and it is to be appreciated that each described aspect can be implemented independently or in connection with one or more other described aspects.

What is claimed is:

1. A method for classifying motion, by a first wireless local area network (WLAN) device, the method comprising:
    transmitting, by the first WLAN device, a sounding packet to a second WLAN device, the first WLAN device being a WLAN Access Point (AP) and the second WLAN device being a WLAN AP;
    receiving, from the second WLAN device, an acknowledgement (ACK) of receiving the sounding packet by the second WLAN device;
    using the received ACK, determining Channel State Information (CSI) for a radio frequency (RF) signal path between the first WLAN device and the second WLAN device;
    aggregating the determined CSI with additional CSI; and
    determining, using the aggregated CSI, a presence or a motion within a structure for classification.

2. The method of claim 1, further comprising:
    receiving at least some of the additional CSI from a third WLAN device.

3. The method of claim 2, wherein the first WLAN device is a mesh WLAN Access Point (AP), wherein the first WLAN device is a root AP in a mesh WLAN, wherein the second WLAN device and the third WLAN device are APs in the mesh WLAN, the method further comprising:
    scheduling, by the first WLAN device, transmission of sounding packets by the first, second, and third WLAN devices; and
    receiving, by the first WLAN device, at least some of the additional CSI from the second and third WLAN devices.

4. The method of claim 3, wherein the sounding packets are transmitted using a backhaul radio link between the APs in the mesh WLAN.

5. The method of claim 2, wherein the third WLAN device is a WLAN Station (STA) in the WLAN, the method further comprising:
scheduling, by the first WLAN device, transmission of sounding packets by the first, second, and third WLAN devices; and
receiving, by the first WLAN device, at least some of the additional CSI from the second and third WLAN devices.

6. The method of claim 1, further comprising:
forwarding the determined presence or motion to a cloud-based service that is effective to cause the cloud-based service to change state information related to the structure.

7. The method of claim 1, wherein the determining the presence or the motion comprises:
extracting motion features from the aggregated CSI;
selecting motion features from the extracted motion features; and
classifying the selected motion features to determine the presence or the motion.

8. The method of claim 7, wherein the determined presence or motion is one of:
no presence;
a human presence;
an animal presence;
a human sitting;
a human walking; or
a human falling.

9. The method of claim 1, wherein the WLAN is an IEEE 802.11 WLAN, wherein the sounding packet is an IEEE 802.11 Null Data Frame (NDF), and wherein the ACK is an IEEE 802.11 ACK.

10. A wireless local area network (WLAN) device, configured as a WLAN Access Point (AP), comprising:
a WLAN radio transceiver;
a processor and memory system to implement a motion sensing manager application configured to:
transmit, using the WLAN radio transceiver, a sounding packet to another WLAN device, the other WLAN device being a WLAN AP;
receive, from the other WLAN device, an acknowledgement (ACK) of reception of the sounding packet by the other WLAN device;
using the received ACK, determine Channel State Information (CSI) for a radio frequency (RF) signal path between the WLAN device and the other WLAN device;
aggregate the determined CSI with additional CSI; and
determine, using the aggregated CSI, a presence or a motion within a structure for classification.

11. The WLAN device of claim 10, wherein the motion sensing manager application is configured to determine the presence or the motion within the structure by:
extracting motion features from the aggregated CSI;
selecting motion features from the extracted motion features; and
classifying the selected motion features to determine the presence or the motion.

12. The WLAN device of claim 10, wherein a third WLAN device is an Access Point (AP), and wherein the WLAN device is configured to receive at least some of the additional CSI from the third WLAN device.

13. A method for classifying motion, by a first wireless local area network (WLAN) device in a WLAN network, the method comprising:

determining, by the first WLAN device, that a second WLAN device can be updated to transmit sounding packets for motion classification;
initiating an update request that is effective to cause a cloud-based server to update software in the second WLAN device;
receiving, by the first WLAN device, a first sounding packet from the second WLAN device after the update of the software of the second WLAN device; and
transmitting, to the second WLAN device, a first acknowledgement (ACK) of receiving the first sounding packet, the transmitting being effective to cause the second WLAN device to:
determine Channel State Information (CSI) for a radio frequency (RF) signal path between the first WLAN device and the second WLAN device; and
transmit the determined CSI to the first WLAN device.

14. The method of claim 13, the method further comprising:
transmitting, by the first WLAN device, a second sounding packet to the second WLAN device;
receiving, from the second WLAN device, a second ACK of the second sounding packet being received by the second WLAN device;
using the received second ACK, determining Channel State Information (CSI) for a radio frequency (RF) signal path between the first WLAN device and the second WLAN device;
receiving additional CSI from the second WLAN device;
aggregating the determined CSI with the additional CSI; and
determining, using the aggregated CSI, a presence or a motion within a structure.

15. The method of claim 13, wherein determining that the second WLAN device can be updated to transmit sounding packets for motion classification comprises:
sending, by the first WLAN device, a request to a cloud-based service to identify WLAN devices installed at a structure that can be updated to support motion classification.

16. The method of claim 13, wherein initiating the update request is effective to cause the cloud-based server to send a notification to a user to approve the update.

17. The method of claim 13, further comprising:
transmitting additional sounding packets to a third WLAN device that is not capable of supporting motion classification;
receiving, from the third WLAN device, ACKs for the additional sounding packets received by the third WLAN device; and
using the ACKs for the additional sounding packets, determining CSI for an RF signal path between the first WLAN device and the third WLAN device.

18. The method of claim 17, wherein the first WLAN device is an IEEE 802.11 station (STA) device, wherein the second WLAN device is an IEEE 802.11 STA device, and wherein the third WLAN device is an IEEE 802.11 Access Point (AP).

19. The method of claim 13, further comprising:
scheduling, by the first WLAN device, transmissions of sounding packets by the second WLAN device; and
transmitting the schedule for sounding packet transmissions to the second WLAN device, the transmitting causing the second WLAN device to transmit sounding packets according to the schedule.

20. The method of claim 13, wherein the WLAN is an IEEE 802.11 WLAN, wherein the sounding packet is an IEEE 802.11 Null Data Frame (NDF), and wherein the ACK is an IEEE 802.11 ACK.

\* \* \* \* \*